United States Patent

Dietz

[15] 3,662,166
[45] May 9, 1972

[54] BATTERY-OPERATED UNIT

[72] Inventor: Johannes Dietz, P.O. Box 61.800, Caracas, Venezuela

[22] Filed: Apr. 17, 1970

[21] Appl. No.: 29,452

[52] U.S. Cl. ..................... 240/10.68, 174/110.8, 240/10.65, 267/153
[51] Int. Cl. .......................................................... F21l 7/00
[58] Field of Search ............... 240/10.6, 10.66, 10.68, 10.67, 240/10.64, 10.65; 174/110.8, 35.5; 156/331; 267/145, 153, 21, 141, 182, 153; 252/500, 510, 511

[56] References Cited

UNITED STATES PATENTS

| | | | |
|---|---|---|---|
| 2,019,884 | 11/1935 | Beaumont | 240/10.68 |
| 2,229,494 | 1/1941 | Desimone | 240/10.6 |
| 2,313,379 | 3/1943 | Wood | 174/35.5 UX |
| 2,502,105 | 3/1950 | Segal | 240/10.65 |
| 2,528,701 | 11/1950 | Mitchell | 240/10.65 |
| 2,953,195 | 9/1960 | Turck, Jr. | 267/145 |
| 3,166,332 | 1/1965 | Olson | 267/153 X |
| 3,172,072 | 3/1965 | Willy | 174/110.8 UX |
| 3,316,396 | 4/1967 | Trott et al. | 240/6.4 |
| 3,467,569 | 9/1969 | Weber et al. | 174/110.8 UX |
| 3,496,058 | 2/1970 | Schroter et al. | 156/331 X |

Primary Examiner—Louis J. Capozi
Attorney—Michael S. Striker

[57] ABSTRACT

A battery-operated unit has a casing one of whose opposite ends is provided with an end wall. At least one battery is received in the casing and has two spaced contacts of opposite polarity one of which faces the endwall. Conductive means contacts the other pole and extends to the region of the end wall. An element composed of synthetic plastic foam material, either made electrically conductive by embedding of metallic material, or metallic coated or metallically wrapped completely or in part, is elastically compressed between the battery and the end wall and in conductive contact with the aforementioned one pole and with the conductive means. A switch is provided in the thus established circuit for opening and closing the same as desired, and an electrical user device is also connected in the circuit, such as a light bulb, a radio receiver, a motor or the like.

8 Claims, 4 Drawing Figures

PATENTED MAY 9 1972 3,662,166

INVENTOR
JOHANNES DIETZ

BY
ATTORNEY

BATTERY-OPERATED UNIT

BACKGROUND OF THE INVENTION

The present invention relates generally to battery-operated devices, and more particularly to a novel battery-operated unit.

Battery-operated electrical devices are becoming more and more popular because of their ready portability, a trend which is facilitated by the development more and more efficient electrical batteries and cells.

In many instances, however, the manner of establishing in such devices an electrical circuit between the battery or cell and whatever user device is provided which is energized by the cell, has not kept pace with the increasing demands made of the reliability of battery-operated devices. Specifically, in many of these devices a circuit is established by having conductive means, which may or may not be the electrically conductive casing of the device itself, make electrical contact with one pole of the battery, whereas the pole of opposite polarity makes contact with a usually coiled spring which tapers conically in axial direction and bears upon one wall of the casing and against the aforementioned other pole of the battery, respectively. The purpose of this spring is tow-fold, in that it not only provides electrical contact and closes the circuit, but also maintains the battery more or less immovable in its position. Usually, these springs are made of copper, but also sometimes of other metals. Unfortunately, it is a very frequent occurrence that these springs corrode. Evidently, even a small area of corrosion can, depending upon where it occurs, interrupt the electrical circuit. Thus, if the spring contacts the battery pole with a small surface portion and corrosion occurs at this surface portion the circuit will be interrupted and the device will not operate, or not operate reliably. This is of course highly undesirable and in many instances cannot only be a source of inconvenience to the user, but may actually be a source of danger if the device is, for instance, a flashlight whose malfunction is detected only at the time of need.

SUMMARY OF THE INVENTION

It is, accordingly, an object of the present invention to avoid the aforementioned disadvantages.

More particularly it is an object of the present invention to provide an improved battery-operated unit which is not possessed of these disadvantages.

In pursuance of the above objects, and others which will become apparent hereafter, one feature of the invention resides in a battery-operated unit which, briefly stated, comprises a casing having two opposite ends and an endwall provided at one of these ends. At least one battery is accommodated in the casing and has two spaced contacts of opposite polarity, one of which faces the endwall. Conductive means contacts the other of the poles and extends to the region of the one pole and an element composed at least in part of electrically compressible synthetic foam material is compressed between the one pole and the end wall. In accordance with the present invention this element replaces the conventional springs used for completing an electrical circuit in devices of the type under discussion and comprises at least a portion which is electrically conductive and which is in contact with the one pole and with the conductive means for completing the electrical circuit. Switch means is interposed in the circuit for opening and closing the same as desired and an electrical user device is interposed in the circuit also for receiving electrical energy from the battery when the circuit is closed.

It will be appreciated that the present invention is applicable to a wide variety of battery-operated units. This includes not only flashlights, but also radios, devices which comprise a motor such as battery-operated electric razors, battery-operated manicuring units, and the like.

The novel features which are considered as characteristic for the invention are set forth in particular in the appended claims.

The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
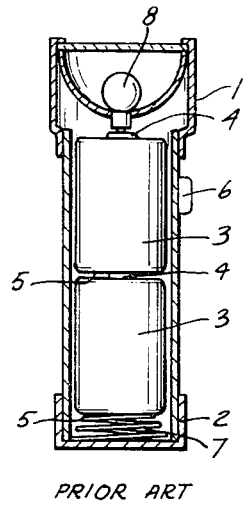
FIG. 1 is a somewhat diagrammatic plan view of a flashlight according to the prior art.

Discussing firstly FIG. 1 it will be seen that in conventional manner this flashlight, which is representative of many of those found in the prior art, comprises a casing 1 having a peripheral wall which may be of electrically insulating material in which case separate conductive means must be provided, or which may be of electrically conductive material in which case the casing itself constitutes a part of the electrically conductive means. In any case, in the illustrated embodiment the casing 1 has an open end which can be closed by an end cap 2 securable to the casing 1 by various means, for instance by means of mating screw threads, by a bayonet-type closure or the like. One or more batteries or cells 3 (in this instance two of them) are accommodated in the interior of the casing 1 and each have a pole 4 of one polarity and another pole 5 of opposite polarity. In the illustrated embodiment the pole 4 of one cell 3 contacts the pole 5 of the other cell 3 whose pole 4 in turn is conductively in contact with a light bulb 8. Reference numeral 6 identifies a switch, such as a conventional slide switch frequently used in this type of flashlight, which interrupts or completes a circuit between the light bulb and the pole 5 of that cell which is closest to the end cap 2.

In accordance with conventional practice there is arranged a copper spring 7 in the end cap 2 and this spring is a conically tapered coiled or helical spring which, when the cap 2 is connected with the casing 1, is axially compressed and bears against the pole 5 of the adjacent cell 3. The spring 7 is in turn connected with the conductive means, for instance the housing 1 if the same is of conductive material, and thus completes the circuit.

The operation of this type of flashlight is too well known to require description, and it is also pointed out that such conventional features as a reflector, a lens and the like have been omitted because they have no bearing on the invention.

Figure 2:
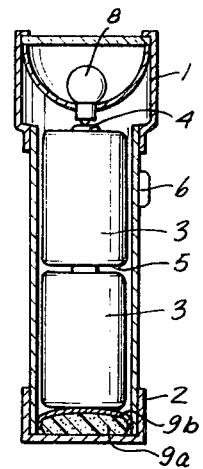
FIG. 2 is a view similar to FIG. 1 but illustrating a flashlight incorporating the present invention.

As pointed out earlier, the springs 7 are subject to corrosion and other difficulties. According to the invention this is avoided with the construction illustrated in FIG. 2 where like reference numerals identify the same elements as in FIG. 1. In the embodiment of FIG. 2, that is the embodiment according to the present invention, however, the spring 7 of the prior-art flashlight in FIG. 1 has been replaced with an element 9 representing the improvement according to the invention. This element 9 is illustrated in the embodiment of FIG. 2 as a body 9a of elastically compressible synthetic plastic foam material which is covered on one end face at its side faces by a layer 9b of metallic material. I have found it advantageous to use for the layer 9b—which can of course have one or more thicknesses—an inexpensively available metal foil, for instance conventional aluminum foil such as it is commercially available for household use. The foil of the layer 9b contacts the pole 5 of the cell 3 which is adjacent the open end of the casing 1, and is compressed against this pole 5 as the body 9a is elastically compressed in response to connection of the end cap 2 with the casing 1. Furthermore, the layer 9b also contacts the conductive material of the casing 1 and/or the end cap 2, and thus completes the circuit. Evidently, if the casing 1 is of non-conductive material then separate conductor means must be provided for establishing this circuit, and the conductor means will then be so arranged that the layer 9b will contact it.

Not only is the element 9 according to the present invention not subject to corrosion and the other difficulties encountered with reference to the springs 7 such as shown in the prior-art construction of FIG. 1, but also it can be manufactured very inexpensively and thus is not only less costly than the spring 7 but also conserves valuable copper or the like which is of course rarer than the materials which are required for making the element 9.

Figure 3:
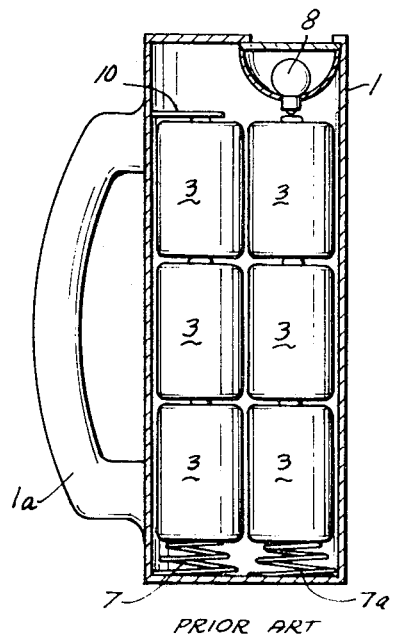
FIG. 3 is a view analogous to FIG. 1 illustrating a different flashlight according to the prior art.
Figure 4:
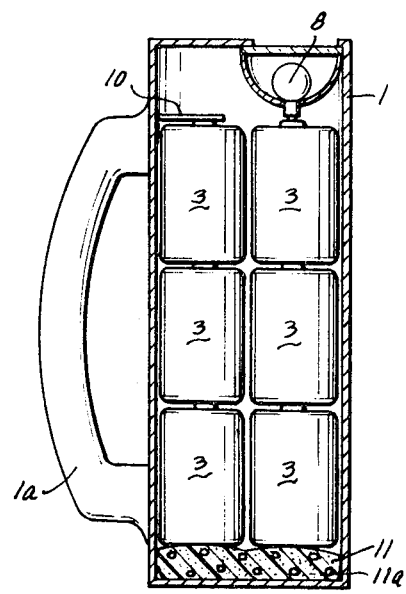
FIG. 4 is a view analogous to FIG. 2 but illustrating the flashlight of FIG. 3 with the present invention incorporated.

In FIGS. 3 and 4 I have contrasted another known flashlight construction with an improved construction according to the present invention. Again, like reference numerals identify the same elements as in preceding Figures, except that in FIG. 3a the illustrated prior-art flashlight has a differently configurated casing 1 formed with a handle 1a and accommodating not two but six—or more or fewer—of the cells 3 which in the illustrated embodiment are arranged in two rows of three each. The casing 1 in the prior-art flashlight of FIG. 3 further differs from the casing in FIGS. 1 and 2 in that it is closed at the end where the springs 7 are located, namely in that the end cap 2 is omitted. The batteries or cells 3 are thus introduced from the other end where the bulb 8 is located, and while this has not been specifically illustrated it is well known how in these constructions the reflector with the bulb can be removed to permit the insertion of the cells 3. In any case, the arrangement of the cells 3 in each row—with respect to their poles of opposite polarity—is the same as in FIGS. 1 and 2. Of course, the circuit must be established connecting the cells of one row with those of the other, and this is also well known to those skilled in the art, so that conductive means has been only diagrammatically suggested at 10. There are two springs 7 provided, each associated with one of the rows of the cells 3 and they are conductively connected with one another by the portion 7a which may be of one piece with them or which may be separate and in conductive contact with them. In this embodiment, as in the prior-art embodiment of FIG. 1, these objections with respect to the springs 7 fully obtain.

They are, however, overcome in accordance with the present invention in the embodiment of FIG. 4 wherein like reference numerals again identify the same elements as in the embodiment of FIG. 3, but wherein the springs 7 have been omitted. They are replaced by an element 11 according to the present invention which is in form of a body of elastically compressible synthetic plastic foam material having embedded therein enough electrically conductive matter 11a—such as metallic particles—to make the entire body 11 electrically conductive. Of course, it is entirely possible to use in place of the element 11 an element such as that identified with reference numeral 9 in FIG. 2, if this is desired. It is also possible to make an element composed of the foamed plastic body 9a which is wrapped entirely in metallic foil corresponding to the layer 9b, just as it is possible to provide only that axial end face of the body 9a which contacts the adjacent pole of the cell or cells, with the layer 9b in form of a foil of aluminum or other conductive material. This will depend largely upon how the remainder of the electrical circuit is constituted, that is whether it is the housing 1 which is itself conductive or whether separate conductive means is provided and where this terminates in the region of the elements 9 or 11, respectively.

Naturally the illustration of use of the novel in the flashlights of FIGS. 2 and 4 is exemplary only. The invention can be equally readily used in portable radios, in battery-operated units or devices wherein it is a motor which is to be energized instead of a bulb 8, and in fact in any application where a battery-operated unit requires an element which not only establishes a conductive connection with one or more batteries to thereby complete a circuit but also is required to exert elastic pressure upon the battery or batteries in order to maintain them in place and to at all times provide for reliable electrical contact.

It is also clear that instead of a layer of foil such as identified with reference numeral 9b in FIG. 2, or embedments such as identified with reference numeral 11a in FIG. 4, a body 9a of synthetic plastic foam material which is resiliently compressible could also be coated on one or more of its outer surfaces with a metallic or generally electrically conductive coating, and that elements such as those identified with reference numerals 9 and 11 can be made in any desired size and shape and that they cannot only be installed in new devices but can also be made as replacements for damaged springs 7 or analogous means in existing devices or units.

It will be understood that each of the elements described above, or two or more together, may also find a useful application in other types of constructions differing from the types described above.

While the invention has been illustrated and described as embodied in a battery-operated unit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A battery-operated unit comprising a casing having two opposite ends and an end wall provided at one of said ends, and a peripheral wall between said ends which includes an electrically inductive portion at least at said one end; at least one battery in said casing having two spaced poles of opposite polarity, one of which faces said end wall; conductive means including said conductive portion contacting the other of said poles and extending to the region of said one pole; an element consisting of elastically compressible synthetic foam material compressed between said one pole and said end wall, and a substantially flexible conductive metal layer interposed between and in contact with said one pole and said foam material and also in contact with said conductive portion of said peripheral wall of said housing for completing a circuit therewith; switch means in said circuit for opening and closing the same as desired; and an electrical user device interposed in said circuit for receiving electrical energy from said battery when said circuit is closed.

2. A unit as defined in claim 1, wherein said user device is an electric bulb.

3. A unit as defined in claim 1, wherein said one end is open; further comprising a cap for said open end and being provided with said end wall; and cooperating retaining portions on said one end and said cap for releasably connecting the latter to the former.

4. A unit as defined in claim 3, wherein said retaining portions are mating screw threads.

5. A battery-operated unit as defined in claim 1 wherein said conductive metal sheet is a metal foil.

6. A unit as defined in claim 5, wherein said metal foil is aluminum foil.

7. A unit as defined in claim 5, wherein said foil is bonded to said foam material.

8. A battery-operated unit as defined in claim 1 wherein said conductive metal sheet is a metal coating.

* * * * *